United States Patent
Blanc et al.

(10) Patent No.: US 9,751,622 B2
(45) Date of Patent: Sep. 5, 2017

(54) WHEEL MOTORIZING SYSTEM, NOTABLY FOR AN AIRCRAFT WHEEL

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Claude Blanc, Clermont-Ferrand (FR); Olivier Essinger, Clermont-Ferrand (FR)

(73) Assignee: COMPAGNIE GENERALE DES ETABLISSEMENTS MICHELIN, Clermont-Ferrand (FR)

(\*) Notice: Subject to any disclaimer, the term of this patent is extended or adjusted under 35 U.S.C. 154(b) by 125 days.

(21) Appl. No.: 14/648,114

(22) PCT Filed: Nov. 29, 2013

(86) PCT No.: PCT/EP2013/075049
§ 371 (c)(1),
(2) Date: May 28, 2015

(87) PCT Pub. No.: WO2014/086670
PCT Pub. Date: Jun. 12, 2014

(65) Prior Publication Data
US 2015/0314862 A1 Nov. 5, 2015

(30) Foreign Application Priority Data
Dec. 3, 2012 (FR) ...................................... 12 61561

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC .............................. B64C 25/405; Y02T 50/823
USPC ....................................................... 244/103 R
See application file for complete search history.

(56) References Cited

U.S. PATENT DOCUMENTS

| 1,952,434 | A | | 3/1934 | Hartsock | |
|---|---|---|---|---|---|
| 3,153,159 | A | * | 10/1964 | Lord | H02K 7/125 310/191 |
| 3,191,454 | A | * | 6/1965 | Holzer | D06F 37/36 310/209 |
| 3,850,389 | A | * | 11/1974 | Dixon | B64C 25/405 244/103 S |

(Continued)

FOREIGN PATENT DOCUMENTS

| WO | WO 95/29094 A1 | 11/1995 |
|---|---|---|
| WO | WO 2011/134503 A1 | 11/2011 |

*Primary Examiner* — Brian M O'Hara
*Assistant Examiner* — Keith L Dixon
(74) *Attorney, Agent, or Firm* — Fitzpatrick, Cella, Harper & Scinto

(57) ABSTRACT

A wheel motorization system, useable for an aircraft to run along a ground surface, includes an electric motor, a driving member securable with a hub of a wheel of the aircraft, and a clutch device connecting an output shaft of the motor to the driving member via a reduction device. The clutch device includes a freewheel device, which allows transmission of a rotational torque only in a first torque transmission direction when the aircraft is travelling forwards.

16 Claims, 8 Drawing Sheets

(56) References Cited

U.S. PATENT DOCUMENTS

| | | | |
|---|---|---|---|
| 8,136,761 B2 * | 3/2012 | Kiyosawa | B64C 25/405 244/103 R |
| 8,794,092 B2 * | 8/2014 | Tizac | B64C 25/405 244/103 R |
| 8,857,544 B2 * | 10/2014 | Essinger | B64C 25/405 180/65.51 |
| 9,139,291 B2 * | 9/2015 | Himmelmann | B64C 25/405 |
| 2006/0065779 A1 | 3/2006 | McCoskey et al. | 244/100 R |
| 2007/0158497 A1 * | 7/2007 | Edelson | B64C 25/405 244/103 S |
| 2012/0138734 A1 * | 6/2012 | Hissong | B64C 25/405 244/50 |
| 2012/0217340 A1 | 8/2012 | Essinger et al. | 244/50 |

\* cited by examiner

WHEEL MOTORIZING SYSTEM, NOTABLY FOR AN AIRCRAFT WHEEL

FIELD OF THE INVENTION

The present invention relates to the field of aircraft and notably wheel motorization while the aircraft is running along the ground.

RELATED ART

More particularly, the invention relates to the motorization of a helicopter wheel.

A distinction is generally made between a plurality of phases of the aircraft running along the ground before the take-off phase or after the landing phase: a very slow movement phase, for example at less than 5 km/hr, currently referred to as the "manoeuvring phase", intended to move the aircraft from a parking/storage point to a loading area and a movement phase when the aircraft is travelling forwards at a slow speed, for example in the order of 20 km/hr, currently referred to as "taxiing". The manoeuvring phase may comprise a reverse movement, in order to move out of a building such as a storage hangar, for example, and/or a forward movement, in order to reach a loading area. Movements during the manoeuvring phase are performed at very slow speeds and usually with the help of ground staff outside the aircraft.

The reverse and/or forward manoeuvring phase at a very slow speed is generally performed with the help of a motor vehicle allowing the aircraft to be steered, such as a tug, for example.

One solution involves connecting an electric motor to the aircraft wheel. However, a direct connection between the wheel and the motor requires the electric motor to quickly reach a high rotation speed during a quick take-off, for example 120 km/hr, and this requires the use of an electric motor capable of withstanding this kind of speed. Moreover, the permanent connection between the wheel and the motor means that the wheel can be locked in the event that the electric motor or the transmission means should lock.

Reference can be made to document WO 2011/073590 which proposes an independent aircraft wheel motorization system comprising an engine block attached to the wheels by a single clutch system and supported by a non-suspended portion of a MacPherson strut. The clutch system allows the engine block to be engaged with or disengaged from the wheel. The engine block is movable in respect of the wheel into a disengaged position during take-off or landing and an engaged position during forward or reverse movement when the aircraft is travelling on the ground at slow speed. However, a system of this kind is complex to realize and requires a physical connection and disconnection between the engine block and the wheel.

Reference can likewise be made to document U.S. Pat. No. 3,034,748 which describes the motorization of the wheels of a helicopter for movement during the manoeuvring phase, comprising a driving block associated with each of the helicopter wheels. The driving block comprises a hydraulic motor and is intended to be removably mounted on the wheel in order to drive it. Each driving block is connected to a hydraulic pump by means of control valves, in order to manage the direction of rotation of the associated wheel. This kind of wheel motorization means that the helicopter rotor blades do not have to be used to move the aircraft. However, the driving block is coupled to the wheel only during the manoeuvring phases and then uncoupled from the wheels. This is an external motorization system referred to in respect of the helicopter.

BRIEF DESCRIPTION OF EMBODIMENTS OF THE INVENTION

The problem addressed by the present invention is therefore that of overcoming these disadvantages.

More particularly, the present invention aims to provide a wheel motorization system integrated in the drivetrain and allowing movement during the manoeuvring and taxiing phase, while at the same time guaranteeing protection of the motorization system during landing, take-off or movements of the aircraft at high speed, for example.

The object of the invention is a wheel motorization system, notably for an aircraft running along the ground, comprising an electric motor, a driving member integral with the wheel hub, a clutch device connecting the output shaft of the electric motor to the driving member via reduction means.

The clutch device comprises a freewheel device allowing transmission of the rotational torque only in a first torque transmission direction when the aircraft is travelling forwards.

The "first torque transmission direction" is understood to mean the transmission of the rotational torque from the electric motor towards the wheel and the "second torque transmission direction" as the transmission of the rotational torque from the wheel towards the motor.

A motorization system of this kind is integral with the landing gear and, more precisely, the wheel's hub carrier. It is therefore installed directly onto the aircraft. Protection of the motorization system is guaranteed when the aircraft is landing at high speed. In effect, the freewheel device only allows the rotational torque to be transmitted from the electric motor towards the aircraft wheel in a single direction, such that when the aircraft lands or runs forwards at high speed, the rotational torque is not transmitted from the wheel towards the electric motor. In this case, the electric motor is not rotated by the wheel which turns freely thanks to the freewheel device. The motor is automatically disconnected from the wheel by the freewheel device.

The clutch device advantageously comprises locking means of the freewheel function of the freewheel device.

Hence, when the freewheel device is locked, the rotational torque is transmitted in both torque transmission directions in the forward and reverse movement of the aircraft.

The locking means can be actuated manually from the ground. In fact, since the aircraft manoeuvring phases are realized close to buildings in the presence of staff outside the aircraft, it is easy for the ground technicians to activate the locking means manually.

Alternatively, the locking means may be activated remotely, for example by electrical means such as an electrical screw actuator. In this case, a safety device can be provided which allows the locking means to be uncoupled when the electrical voltage falls below a threshold value.

The supply to the electric motor of the motorization system, as well as to the locking means of the freewheel device, can be made by means of a supply source located on the aircraft, such as an on-board battery or by the aircraft's on-board network. Alternatively, a power source external to the aircraft can be used, such as a battery connected by electrical connections during the manoeuvring phases.

The reduction means advantageously comprise a drive pinion attached to the output shaft of the motor and engaging with an intermediate shaft.

The reduction means comprise, for example, at least two reduction stages and the freewheel device may be disposed between the reduction stages. Alternatively, the freewheel device could be disposed upstream or downstream of the reduction stages.

According to one embodiment, the reduction means comprise three reduction stages.

For example, the first reduction stage is made up of the engagement of the drive pinion and a first toothed wheel attached to a first intermediate shaft, the second reduction stage is made up of the engagement of a first reduction pinion attached to the first intermediate shaft and a second toothed wheel attached to a second intermediate shaft and the third reduction stage is made up of the engagement of a second reduction pinion attached to the second intermediate shaft and of the driving member.

The clutch device is advantageously disposed between the second and third reduction stages.

According to one embodiment, the locking means comprise a locking bell coaxial with said freewheel device and exhibiting on its periphery axial driving claws spaced apart from one another and intended to cooperate with similarly shaped claws on the second toothed wheel.

The intermediate shafts are, moreover, parallel to the axis of the wheel hub. Alternatively, it is possible to envisage the intermediate shafts not being parallel to the hub axis, notably through the integration of gears allowing transmissions at 45° or 90°.

The driving member is, for example, a toothed gear ring.

According to one embodiment, the wheel motorization system comprises a means of mechanical protection against overtorque capable of decoupling the driving member of the wheel hub when the torque transmitted to the wheel hub by the driving member is greater than a threshold value.

According to a second aspect, the invention relates to an aircraft comprising at least one wheel fitted with a wheel motorization system such as that described above. In fact, it is possible to motorize only a front landing gear comprising a single wheel or a pair of wheels, generally referred to as the nose. It could be envisaged that said motorized wheel would be steered, in other words associated with a steering system such as an electrical actuator, for example. In the case of a pair of wheels, the electrical actuator may be associated with a differential management system of the torques applied to each of the wheels. Hence, thanks to the differential management system of the torques and when the pair of wheels is mounted on a freely rotating gear strut, it is possible to pivot the undercarriage forwards by 180° by applying a rotational torque to only one of the motorized wheels. Consequently, when the aircraft reverses, the rotational torque is transmitted from the motors towards the motorized wheels, without any need for locking means of the freewheel device. Means of measuring the angular position of the gear strut are necessary in order to effect this manoeuvre. The gear strut is capable of being locked to prevent rotation during the landing of the aircraft.

It could be provided that the front landing gear of the aircraft comprises, in addition to the pair of motorized wheels, two twin wheels.

In another embodiment, the aircraft comprises at least one landing gear provided with at least two wheels each fitted with a wheel motorization system such as that described previously.

For an aircraft comprising at least one main non-steerable landing gear and a steerable landing gear, motorization of the wheels is preferably realized on at least one of the wheels of the main landing gear. The steerable landing gear may, for example, be a tail wheel, the steering of which can be locked during the taxiing phase, for example.

The aircraft may be a helicopter.

BRIEF DESCRIPTION OF THE DRAWINGS

Other aims, characteristics and advantages of the invention will emerge on reading the following description, provided solely by way of a non-limiting example and made with reference to the attached drawings in which.

DETAILED DESCRIPTION OF EMBODIMENTS OF THE INVENTIOIN

Figure 1:
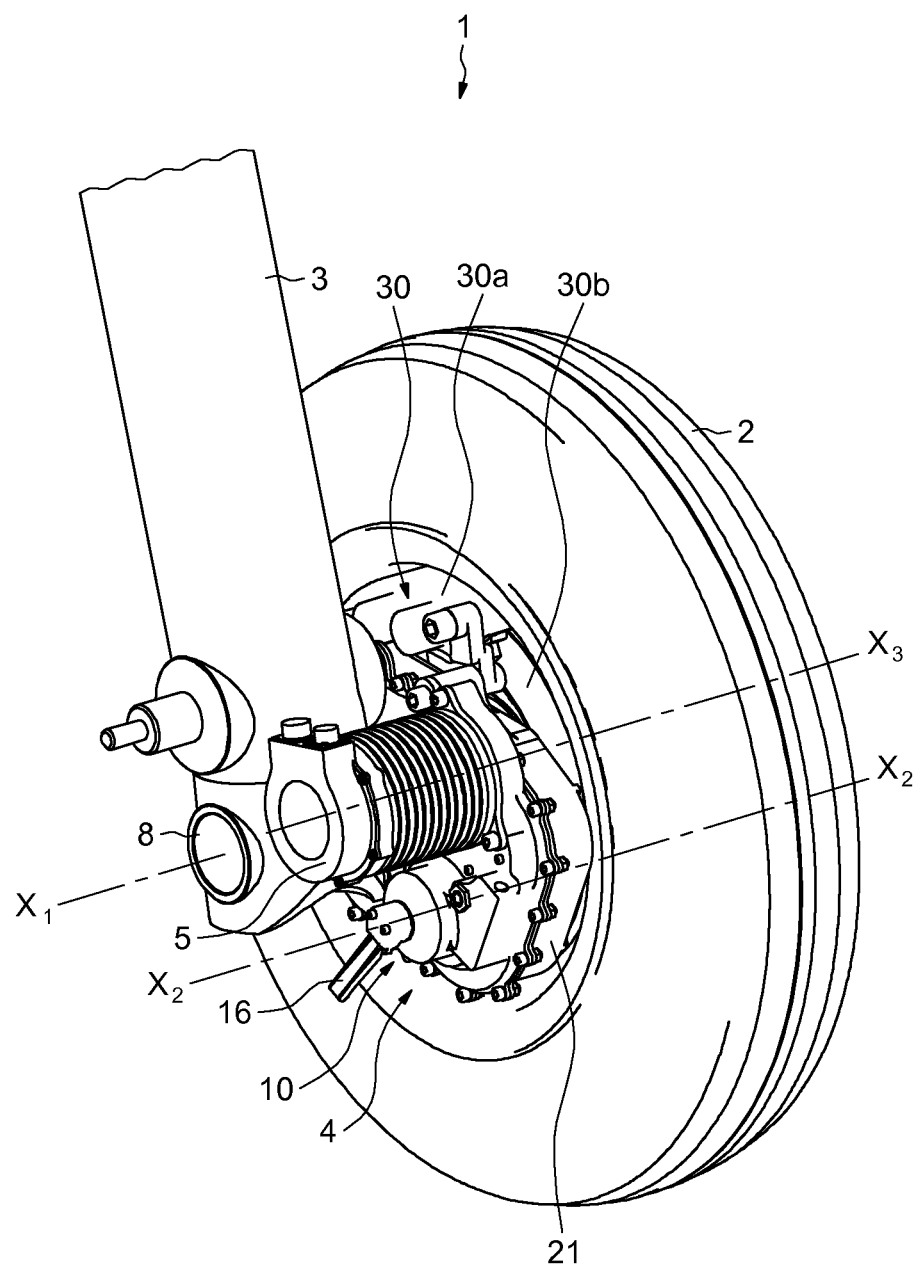
FIG. 1 depicts a perspective view of part of a landing gear of an aircraft equipped with a wheel and a wheel motorization system according to the invention.

As illustrated in FIG. 1, part of a landing gear of an aircraft which may be a helicopter, for example, referred to as 1 in its assembly, comprises a wheel 2, a gear strut 3 supporting the wheel 2 and a motorization system 4 of the wheel 2 for the aircraft to run on the ground.

The wheel motorization system 4 comprises an electric motor 5, such as a three-phase synchronous motor with permanent magnets and a driving member 6 such as a gear ring, for example. The gear ring 6 is integral with the hub 7 of the wheel 2 and attached to the output shaft 5a of the motor 5 via a clutch device 10 and reduction means 20. The clutch device 10 and reduction means 20 are housed in a reduction housing 21 that can be seen in FIG. 1. As illustrated in FIG. 1, the wheel motorization system 4 comprises a braking system 30 mounted on the reduction housing 21. In the example illustrated, the braking system 30 is a disc brake comprising a disc 30b fixed on the wheel hub 7 and brake pads (not shown) rubbing on either side of the disc 30b. The brake pads are held in a caliper or a brake plate 30a fixed to the reduction housing 21. The integration of a braking system 30 in the wheel motorization system 4 is easily effected by simply fixing the brake caliper 30a to the housing 21. A braking system 30 of this kind is known in the art and will not be further described.

Figure 2:
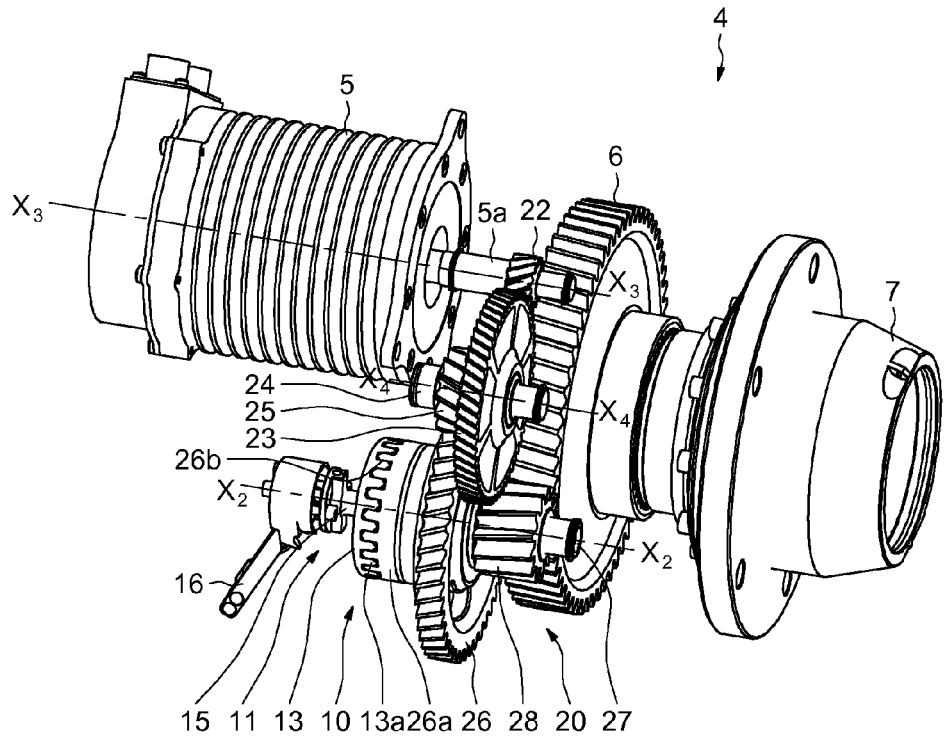
FIG. 2 depicts a perspective view of the wheel motorization system according to the invention, represented without a housing.

As illustrated in detail in FIG. 2, the reduction means 20 comprise a drive pinion 22 attached to the output shaft 5a of the motor 5 by axis $X_3$-$X_3$ and driving the driving member 6 by means of three reduction stages. Alternatively, a lower or higher number of reduction stages could be envisaged between the drive pinion 22 and the gear ring 6.

The first reduction stage comprises the engagement of the gear of the drive pinion 22 and a first toothed wheel 23 attached to a first intermediate shaft 24 of axis $X_4$-$X_4$, the second reduction stage comprises the engagement of a first reduction sprocket 25 attached to the first intermediate shaft 24 and of a second toothed wheel 26 attached to a second intermediate shaft 27 of axis $X_2$-$X_2$ and the third reduction stage comprises a second reduction sprocket 28 attached to the second intermediate shaft 27 and the gear wheel 6 attached to the hub 7 of the wheel 2.

The first intermediate shaft 24, the second toothed wheel 26 and the second intermediate shaft 27 are mounted rotationally in the housing 21 or else by means of bearings 21e, 21d and 21c. The second toothed wheel 26 is, moreover, mounted on the second intermediate shaft 27 by means of bearings 26c.

The toothed wheels 23, 26 and the gear wheel 6 comprise on their periphery teeth (not labelled) which may be straight or inclined. The sprockets 22, 25, 28 are likewise provided with straight or inclined teeth (not labelled). By way of a non-limiting example, the total reduction ratio is in the order of 77. Alternatively, any other reduction ratio could be provided for.

The intermediate shafts 24, 27 are parallel to axis $X_1$-$X_1$ of the hub 7 of the wheel 2 and to axis $X_3$-$X_3$ of the motor 5. Alternatively, it could be envisaged that the intermediate shafts and/or the shaft of the motor are not parallel to the hub axis, notably through the integration of gears allowing angular transmissions.

As illustrated in FIG. 2, the clutch device 10 comprises locking means 11 described in detail with reference to FIGS. 4 to 6.

Figure 3:
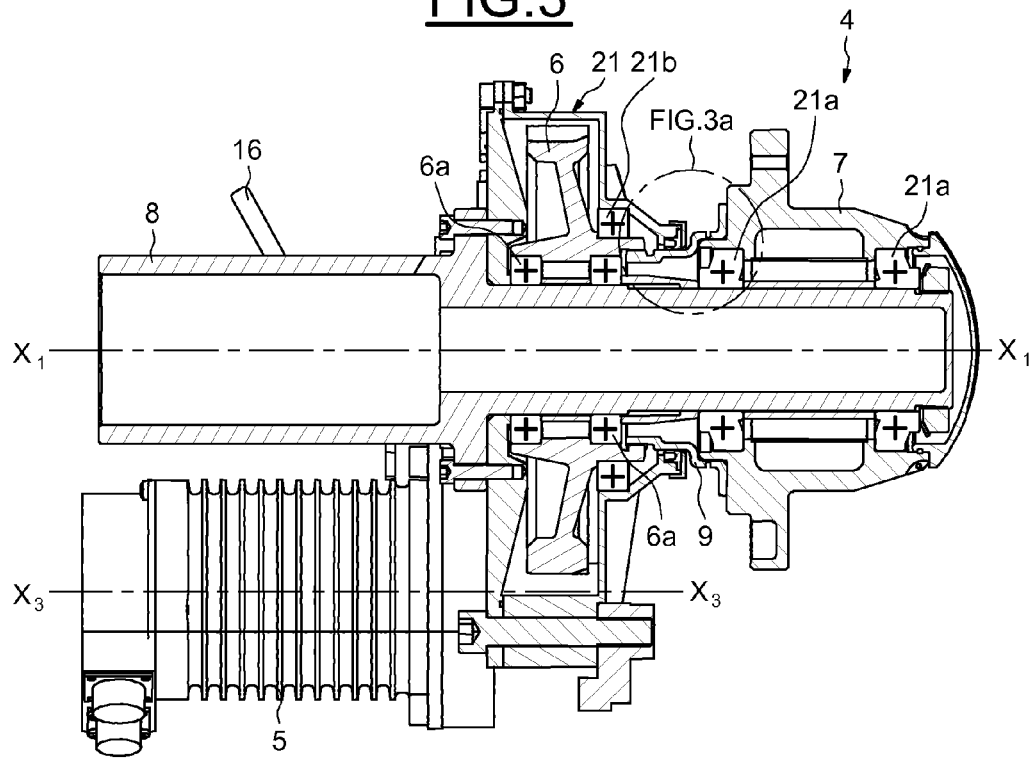
FIG. 3 depicts a sectional view along axis $X_1$-$X_1$ in FIG. 1.

FIG. 3 illustrates a sectional view passing through axis $X_1$-$X_1$ of the wheel 2, the wheel not being shown. The wheel 2 is supported by a wheel hub 7 mounted rotationally by means of bearings 21a on a hub carrier 8 or integral wheel stub axle of the gear strut 3. The gear ring 6 shown in FIGS. 2 and 3 is integral with the wheel hub 7 by means of a fixing cuff 9, for example, and rotatably mounted by means of bearings 6a, 21b on the hub carrier 8 and in the housing 21.

Figure 3A:
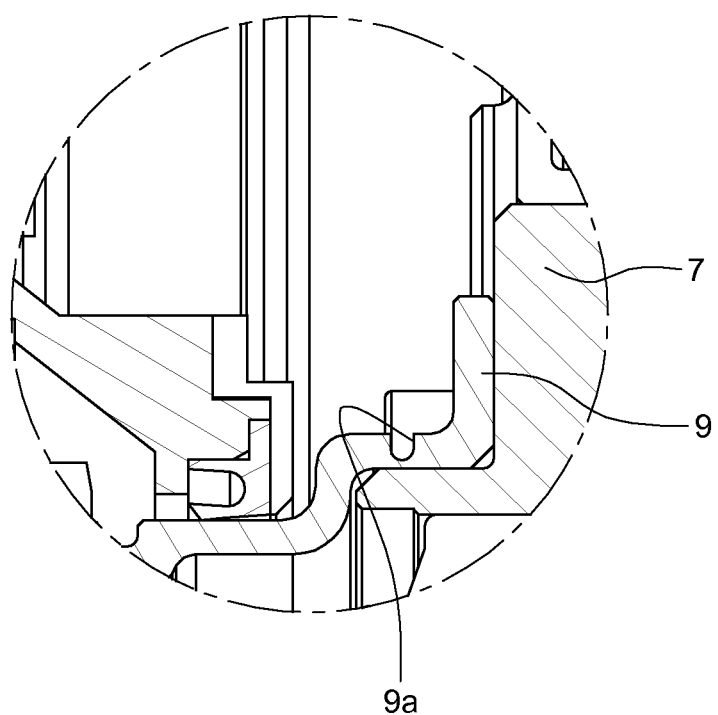
FIG. 3a depicts a detail of FIG. 3.

As illustrated in detail in FIG. 3a, the fixing cuff 9 comprises an annular groove 9a allowing the fixing cuff 9 to break away from the wheel hub 7, notably when the torque transmitted to the wheel hub 7 by the driving member 6 is too great, for example higher than a threshold value. The threshold value may, for example, be fixed at twice the maximum torque transmissible to the wheel hub 7 by the electric motor. The annular groove 9a acts as a means of overtorque protection capable of being cut off in the event of an excessively high torque and thereby allows protection of the aircraft and of the motorization system. In fact, in the absence of this protection during the aircraft's landing, if the wheel motorization system is locked following a malfunction of the freewheel device or after a failure to uncouple locking means, for example, the wheel tyre could then be forced to slide along the ground or to exert a significant braking torque, leading to its deterioration and the risk of losing control of the aircraft or damaging the wheel motorization system.

It will be noted that any mechanical means comprising a part acting as a fuse against overtorque or allowing, for example, sliding in the event of an overtorque could be used as a means of mechanical protection against overtorque.

Figure 4:
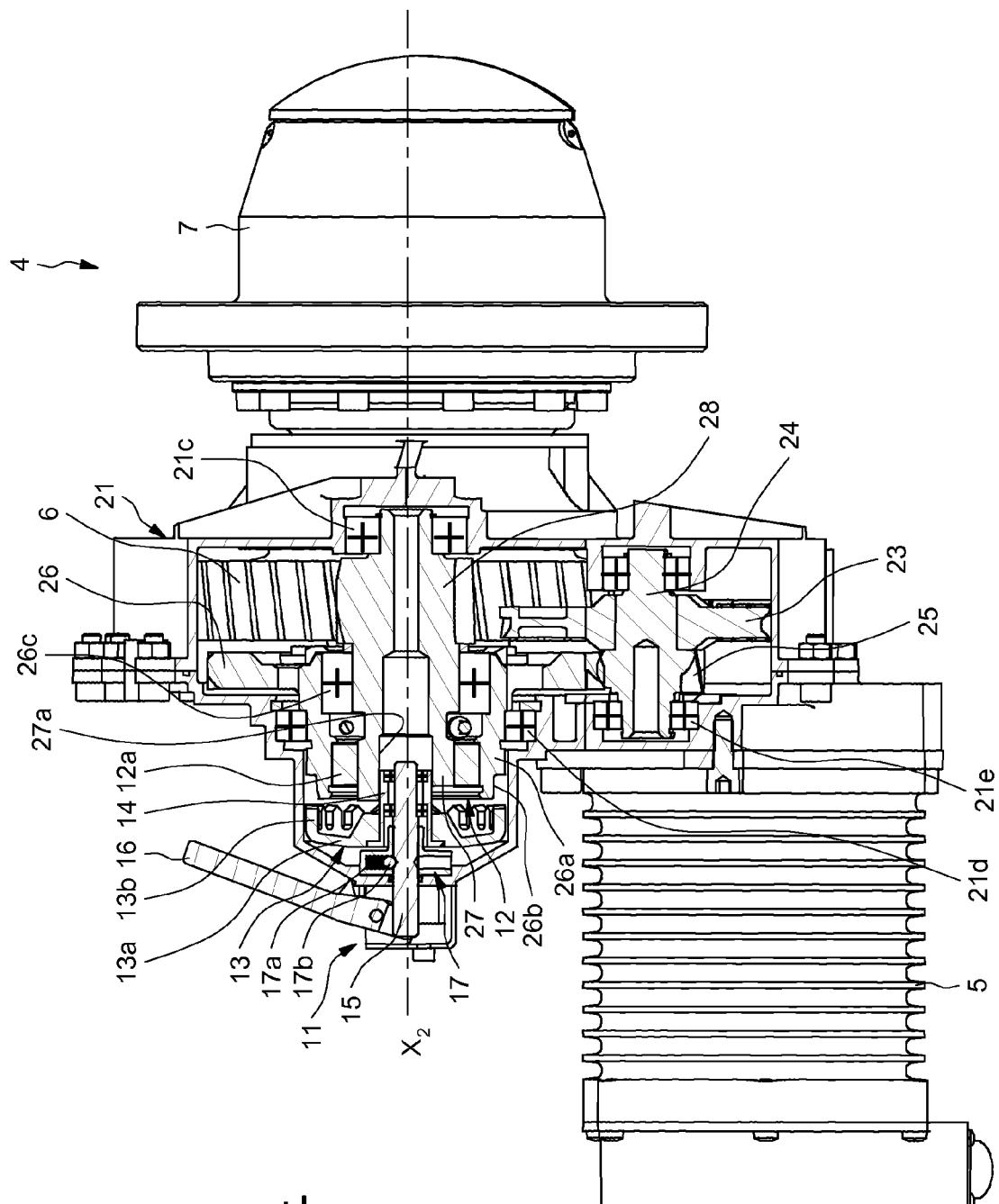
FIG. 4 depicts a sectional view along axis $X_2$-$X_2$ in FIG. 1, the locking means of the freewheel device not being activated.
Figure 5:
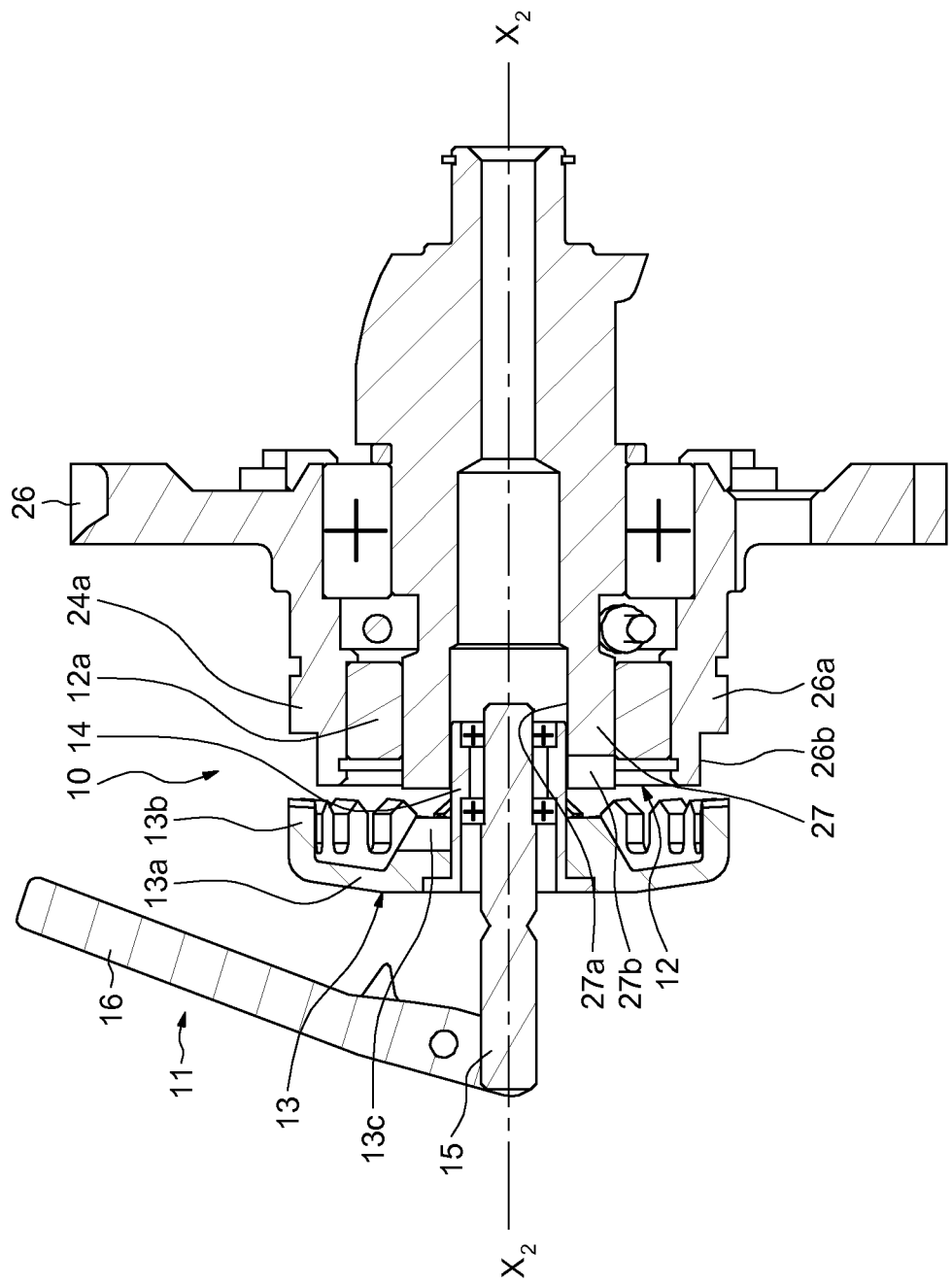
FIG. 5 depicts in detail the clutch device in FIG. 4, shown without a housing, the locking means of the freewheel device not being activated.
Figure 6:
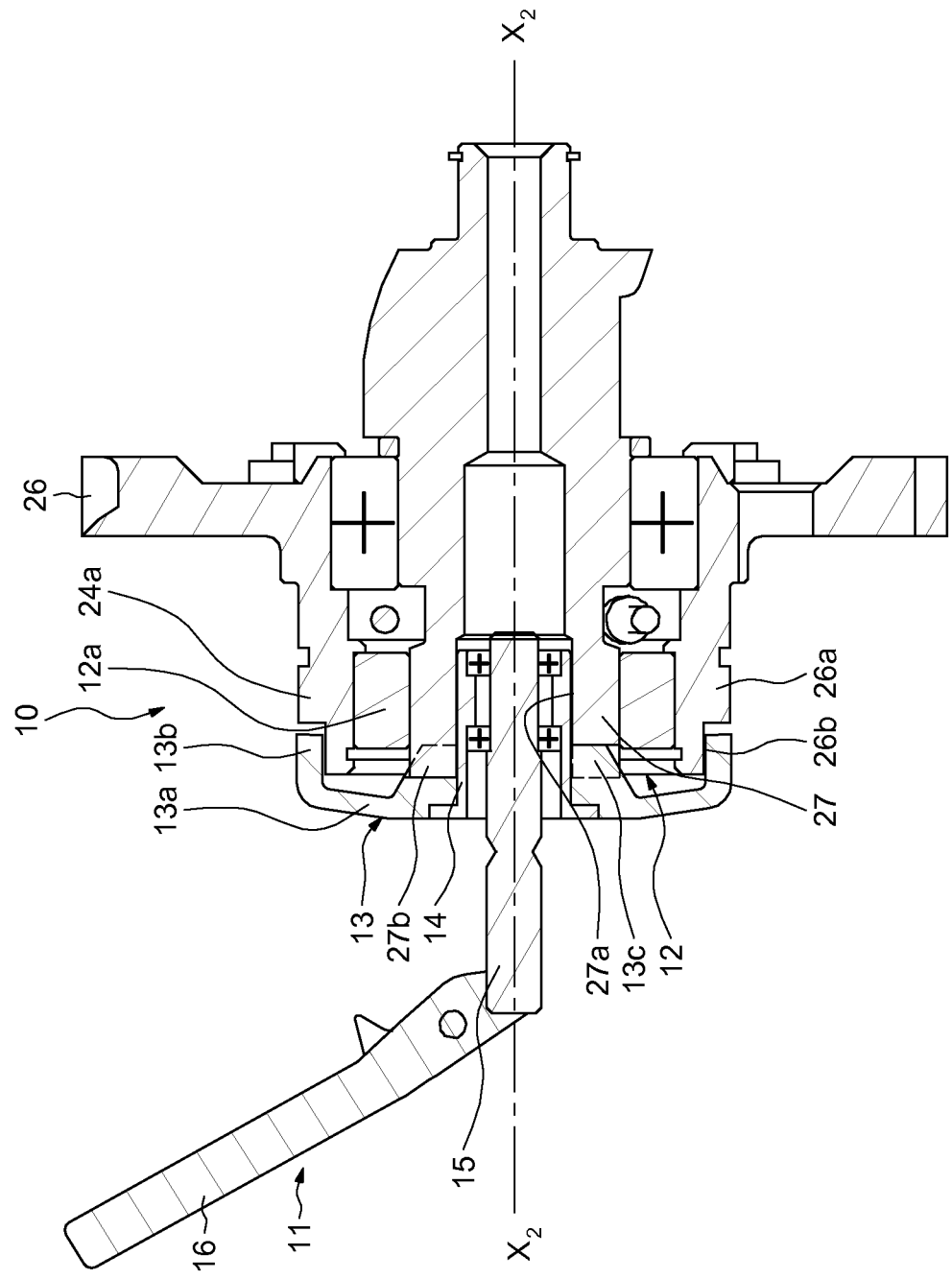
FIG. 6 depicts a detail of the clutch device in FIG. 4 shown without a housing, the locking means of the freewheel device being activated.

FIGS. 4 to 6 illustrate a sectional view passing through axis $X_2$-$X_2$ of the second intermediate shaft 27.

The clutch device 10 comprises a freewheel device 12 shown in FIGS. 4 to 6 which, when the aircraft is moving forwards, allows transmission of the rotational torque in a first torque transmission direction, not allowing transmission of the rotational torque in a second torque transmission direction. The first torque transmission direction is understood to be transmission of the rotational torque from the electric motor 5 towards the wheel 2 and the second transmission direction, transmission of the rotational torque from the wheel 2 towards the motor 5.

The freewheel device 12 therefore allows the unidirectional transmission of the rotational torque in the first torque transmission direction (from the electric motor 5 towards the aircraft wheel) when the aircraft is moving forwards, such that the rotational torque is not transmitted in the second transmission direction, in other words from the wheel 2 towards the electric motor 5. Because the wheel 2 is then disengaged, it is able to turn freely. When the aircraft lands or runs thanks to its main propulsion means, the rotational torque of the wheel 2 is not transmitted to the electric motor 5 which is not therefore driven rotationally by the wheel 2 thanks to the freewheel device 12.

When the aircraft reverses on the ground, the freewheel device 12 does not allow transmission of the rotational torque in the first torque transmission direction (from the motor 5 towards the wheel 2) and allows the rotational torque to be transmitted in the second torque transmission direction (from the wheel 2 towards the motor 5).

Freewheel device is understood to mean an element mounted between two concentric parts generally comprising an inner ring mounted on a shaft of the first part and an outer ring mounted in a bore of the second part. Between these two rings are located non-return elements preventing transmission of the torque in one direction such as, for example, catches, cams or rollers.

As illustrated in the figures, the freewheel device 12 comprises non-return elements 12a mounted between the second and the third reduction stage, notably between the second intermediate shaft 27 and the hub 26a of the second toothed wheel 26. These non-return elements 12a prevent transmission of the rotational torque in the second torque transmission direction (from the wheel towards the motor) when the aircraft is moving forwards and transmission of the rotational torque in the first torque transmission direction (from the motor towards the wheel) when the aircraft is reversing.

In the example shown, the hub 26a of the second toothed wheel 26 acts as an outer ring for the non-return elements 12a and the second intermediate shaft 27 acts as an inner ring for the non-return elements 12a. Alternatively, independent inner and outer rings installed in the reduction means could be envisaged. It will be noted that the freewheel device may be disposed at any point between two reduction stages, as well as upstream or downstream of the reduction stages.

As illustrated in detail in FIGS. 4 to 6, the locking means 11 are intended to lock the freewheel function of the freewheel device 12. Hence, when the freewheel device 12 is locked, the rotational torque is transmitted in the two torque transmission directions when the aircraft is moving forwards and reversing.

The locking means 11 which can be seen in detail in FIGS. 5 and 6 comprise a claw mechanism 13 with the same axis as the axis of the freewheel device 12, and notably coaxial with the second intermediate shaft 27 and the second toothed wheel 26. The claw mechanism 13 comprises a locking bell 13a cooperating with the hub 26a of the second toothed wheel 26. An axial sheath 14 is integral with locking bell 13a and cooperates with an axial drill hole 27a made in the second intermediate shaft 27.

The locking bell 13a exhibits driving claws 13b on its periphery. The claws 13b are disposed axially, spaced apart from one another, and cooperate frontally with similarly shaped recesses 26b made on the periphery of the hub 26a of the second toothed wheel 26. In other words, the driving claws 13b cooperate with the outer ring of the freewheel device 12.

Similar driving claws 13c are present on the central section of the locking bell 13a about the axial sheath 14. The claws 13c are spaced apart from one another and cooperate frontally with similarly shaped recesses 27b present at the end of the second intermediate shaft 27. In other words, the driving claws 13c cooperate with the inner ring of the freewheel device 12. Alternatively, this latter rotational link could be permanent, the sheath 14 for example exhibiting ribs made on its outer surface cooperating with similarly shaped grooves made on the bore 27a of the second intermediate shaft 27.

An actuator rod 15 is mounted rotationally in the axial sheath 14 and intended to be displaced axially along axis $X_2$-$X_2$ so as to move the locking bell 13a into a disconnected uncoupling position of the second intermediate shaft 27 with the hub 26a of the second toothed wheel 26, which can be seen in FIGS. 4 and 5, or a connected coupling position of the second intermediate shaft 27 with the hub 26a of the second toothed wheel 26, which can be seen in FIG. 6. The action of the locking bell 13a allows the second intermediate shaft 27 to be attached to the second toothed wheel 26 when the aircraft is moving forwards and also reversing.

The actuator rod 15 may be manually actuated by a handle 16 from the outside of the aircraft. In fact, since the manoeuvring phases of the aircraft are performed proximate to the buildings, it is easy for ground staff to step in to operate the locking means 11 manually.

As illustrated in FIG. 4, a means of holding in position 17 of the actuator rod 15 is integral with the housing 21 and comprises a spring 17a and a ball 17b. The means of holding in position 17 allows the locking means 11 to be held in the uncoupled position. It will be noted that any other means of holding the locking means 11 in position could be provided.

Figure 7:
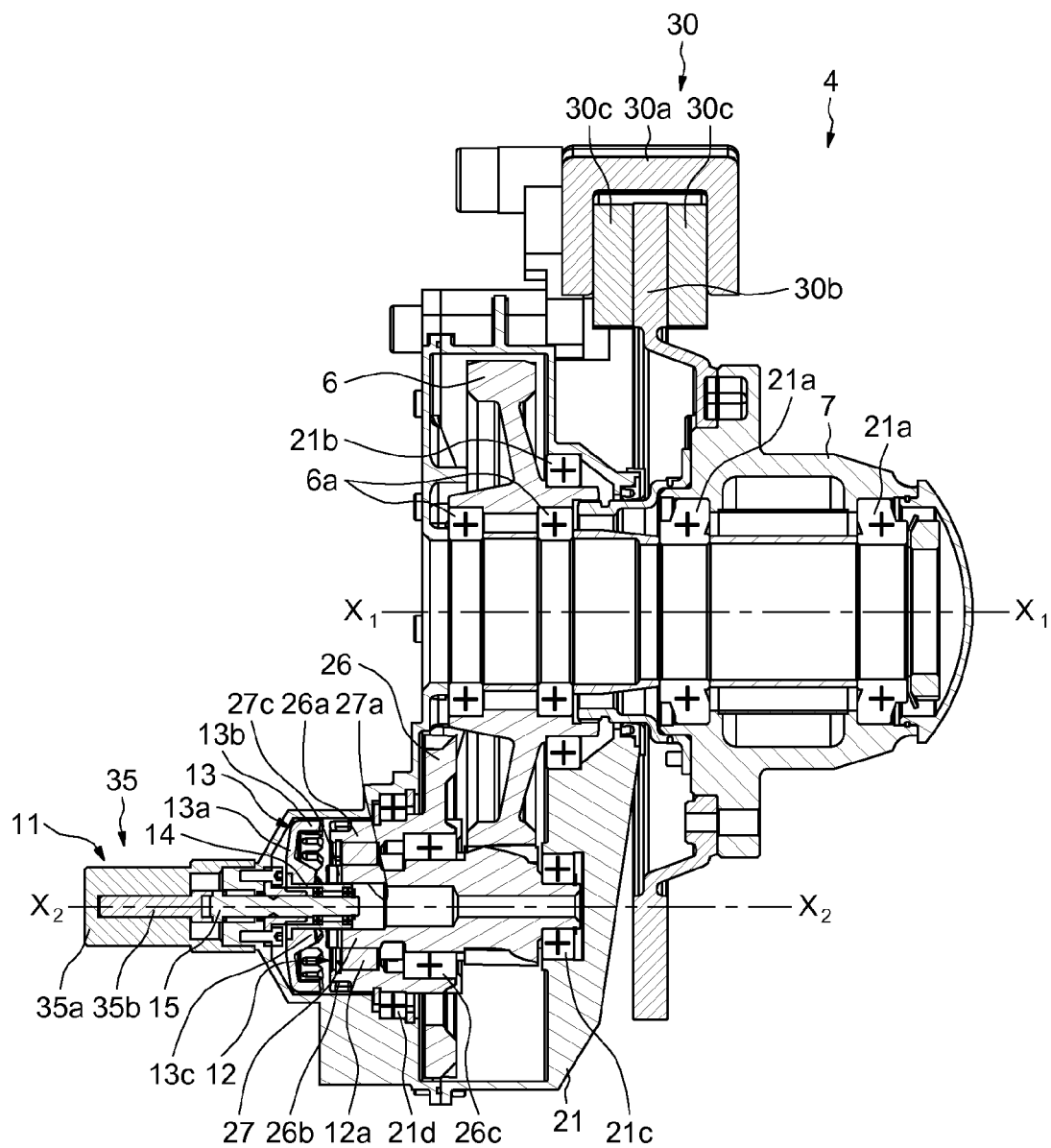
FIG. 7 depicts a sectional view of a wheel motorization system according to another embodiment, the locking means of the freewheel device not being activated
Figure 8:
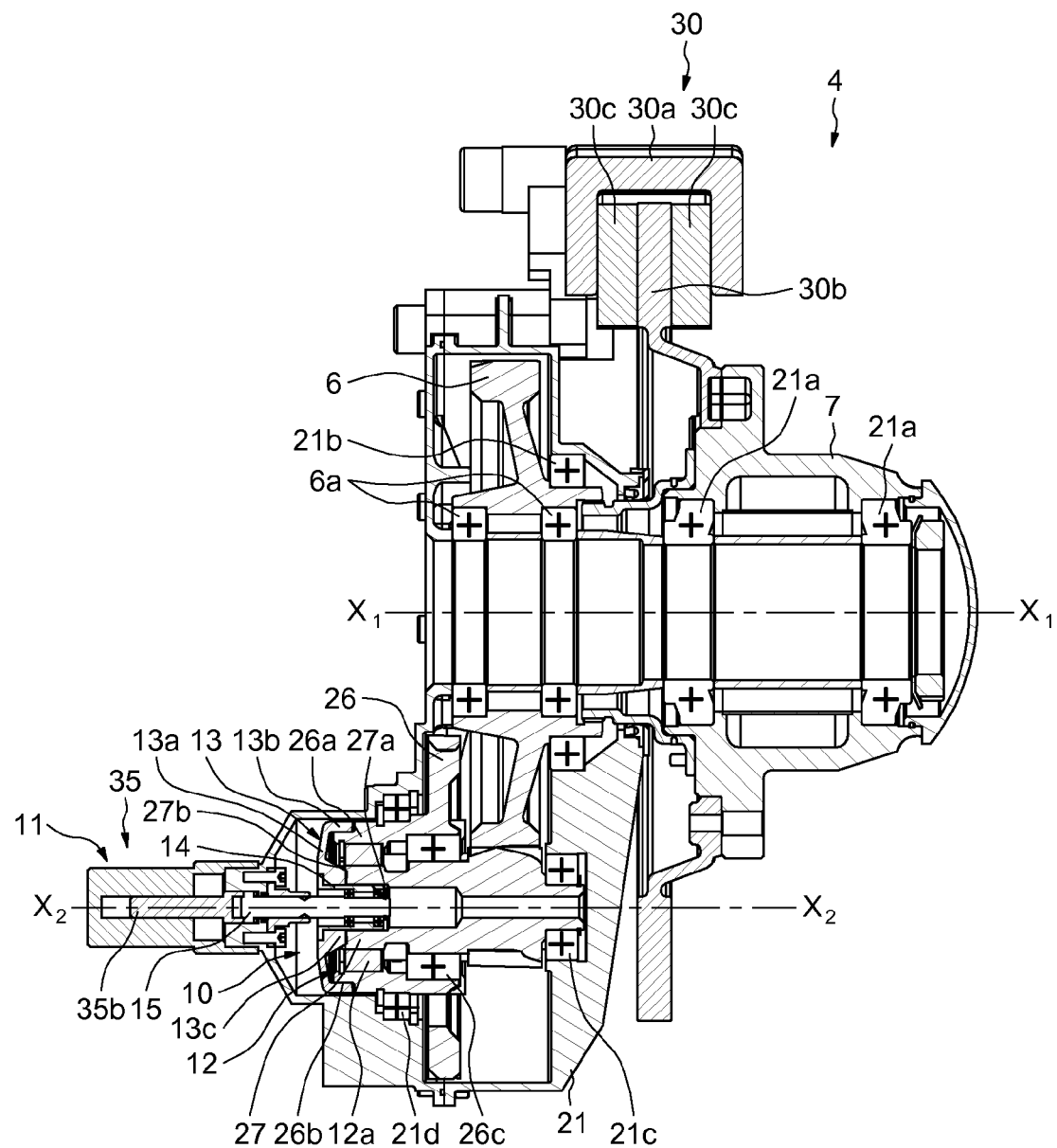
FIG. 8 depicts the view in FIG. 7, the locking means of the freewheel device being activated.

The embodiment illustrated in FIGS. 7 and 8, in which the same elements have the same reference numbers, differs substantially from the embodiment illustrated in FIGS. 1 to 6 through the remote-controlled operation of the actuator rod 15 of the locking means 11.

As shown in FIGS. 7 and 8, the actuator rod 15 is operated electrically by an electrical screw actuator 35. The electrical screw actuator 35 comprises an actuator housing 35a holding a rotor (not shown) provided with an axial thread $X_2$-$X_2$ cooperating with a threaded rod 35b integral with the actuator rod 15. The threaded rod 35b, which has a helical link with the rotor turning in the actuator housing 35a, transmits an axial movement to the locking bell 13a by means of the driving sheath 14 and the actuator rod 15. The locking bell 13a is thereby displaced along axis $X_2$-$X_2$ into a disconnected uncoupling position of the second intermediate shaft 27 with the hub 26a of the second toothed wheel 26, which can be seen in FIG. 7, or into a connected coupling position of the second intermediate shaft 27 with the hub 26a of the second toothed wheel 26, which can be seen in FIG. 8.

When the locking means 11 are actuated, the second intermediate shaft 27 is attached to the hub 26a of the second toothed wheel 26, such that the freewheel function of the non-return elements 12a of the freewheel device is locked.

The screw actuator 35 may be supplied with electrical energy by an external supply source during manoeuvring phases. Alternatively, a supply from an on-board battery or by any other source of power on the aircraft could be envisaged.

The braking system 30 is shown in detail in FIGS. 7 and 8 and comprises a disc 30b fixed on the wheel hub 7 and brake pads 30c disposed on either side of the disc 30b and rubbing against each side of the disc 30b. The brake pads 30c are held in a caliper 30a or a brake plate fixed to the reduction housing 21.

Thanks to the invention that has just been described, the aircraft is easily able to run along the ground while protection of the wheel motorization system is incorporated.

In fact, during the forward movement phase, the electric motor transmits a rotational torque to the wheel, in order to drive it by means of the freewheel device and reduction means. Thanks to the freewheel device, when the aircraft lands or moves forwards at high speed, the rotational torque is not transmitted in a second torque transmission direction from the wheel towards the electric motor. The electric motor is not therefore driven rotationally by the wheel.

Moreover, in one embodiment, the locking means, actuated during the manoeuvring phases, allow the freewheel phenomenon to be blocked and thereby allow the motor to transmit a rotational torque to the wheel during forward and reverse movement.

Finally, the wheel motorization system may incorporate an additional protection system in the event of overtorque, when the freewheel device is inadequate, for example.

The invention claimed is:

1. A wheel motorization system useable for an aircraft to run along a ground surface, the system comprising:
    an electric motor;
    a driver securable to a hub of a wheel of the aircraft; and
    a clutch connecting an output shaft of the motor to the driver via a reducer,
    wherein the clutch includes a freewheel structured to allow transmission of a rotational torque only in a first torque transmission direction when the aircraft is travelling forwards,
    wherein the freewheel includes non-return elements mounted between an inner ring and an outer ring of the clutch, and
    wherein the clutch includes a lock that locks a freewheeling function of the freewheel, the lock including:
        a locking bell that is coaxial with an axis of the freewheel,
        peripheral driving claws extending from a periphery of the locking bell, the peripheral driving claws being structured to cooperate with the outer ring, and
        central driving claws positioned at a central region of the locking bell, the central driving claws being structured to cooperate with the inner ring.

2. The wheel motorization system according to claim 1, wherein the lock is manually or electrically actuatable.

3. The wheel motorization system according to claim 1, wherein the reducer includes a drive pinion attached to the output shaft of the motor, and wherein the reducer is structured to engage with an intermediate shaft.

4. The wheel motorization system according to claim 1, wherein the reducer includes at least two reduction stages.

5. The wheel motorization system according to claim 4, wherein the reducer includes two reduction stages, and the freewheel is disposed between the two reduction stages.

6. The wheel motorization system according to claim 1, wherein the reducer includes first, second, and third reduction stages.

7. The wheel motorization system according to claim 6, wherein:
the first reduction stage corresponds to an engagement of a drive pinion and a first toothed wheel attached to a first intermediate shaft,
the second reduction stage corresponds to an engagement of a first reduction pinion attached to the first intermediate shaft and a second toothed wheel attached to a second intermediate shaft, and
the third reduction stage corresponds to an engagement of a second reduction pinion attached to the second intermediate shaft and the driver.

8. The wheel motorization system according to claim 7, wherein the clutch is disposed between the second and third reduction stages.

9. The wheel motorization system according to claim 8, wherein the peripheral driving claws of the locking bell are spaced apart from one another and structured to cooperate with first recesses located on the second toothed wheel, the first recesses being complementary in shape to the peripheral driving claws, and
wherein the central driving claws of the locking bell are spaced apart from one another and structured to cooperate with second recesses located at an end of the second intermediate shaft, the second recesses being complementary in shape to the central driving claws.

10. The wheel motorization system according to claim 7, wherein the first and second intermediate shafts are arranged parallel to an axis of the hub of the wheel.

11. The wheel motorization system according to claim 1, wherein the driver is a toothed gear ring.

12. The wheel motorization system according to claim 1, further comprising a mechanical overtorque protection structure to protect against an overtorque decoupling of the driver from the hub of the wheel when a torque transmitted by the driver to the hub of the wheel is greater than a threshold value.

13. An aircraft comprising at least one motorized wheel, wherein each motorized wheel includes:
a wheel; and
a wheel motorization system that includes:
an electric motor,
a driver securable to a hub of the wheel, and
a clutch connecting an output shaft of the motor to the driver via a reducer,
wherein the clutch includes a freewheel structured to allow transmission of a rotational torque only in a first torque transmission direction when the aircraft is travelling forwards,
wherein the freewheel includes non-return elements mounted between an inner ring and an outer ring of the clutch, and
wherein the clutch includes a lock that locks a freewheeling function of the freewheel, the lock including:
a locking bell that is coaxial with an axis of the freewheel,
peripheral driving claws extending from a periphery of the locking bell, the peripheral driving claws being structured to cooperate with the outer ring, and
central driving claws positioned at a central region of the locking bell, the central driving claws being structured to cooperate with the inner ring.

14. The aircraft according to claim 13, wherein the aircraft includes two motorized wheels corresponding to the at least one motorized wheel, the two motorized wheels forming a part of a landing gear system of the aircraft.

15. The aircraft according to claim 13, wherein the aircraft is a helicopter.

16. The wheel motorization system according to claim 8,
wherein the hub of the second toothed wheel acts as the outer ring for the non-return elements, and
wherein the second intermediate shaft acts as the inner ring for the non-return elements.

* * * * *